United States Patent [11] 3,609,701

[72] Inventor Allan L. Budd
San Diego, Calif.
[21] Appl. No. 20,560
[22] Filed Mar. 18, 1970
[45] Patented Sept. 28, 1971
[73] Assignee Typagraph Corporation
San Diego, Calif.

[54] DATA TERMINAL SYSTEM
2 Claims, 10 Drawing Figs.

[52] U.S. Cl. .......... 340/172.5
[51] Int. Cl. .......... G06f 3/12
[50] Field of Search .......... 340/172.5, 324; 346/29

[56] References Cited

UNITED STATES PATENTS

| | | | |
|---|---|---|---|
| 3,199,111 | 8/1965 | Jennings et al. | 340/172.5 X |
| 3,402,395 | 9/1968 | Culler et al. | 340/172.5 |
| 3,425,038 | 1/1969 | Trousdale | 340/172.5 |
| 3,430,207 | 2/1969 | Davis | 340/172.5 |
| 3,434,113 | 3/1969 | Wiley et al. | 340/172.5 |
| 3,438,003 | 4/1969 | Bryan | 340/172.5 |
| 3,544,972 | 12/1970 | Trousdale | 340/172.5 |

*Primary Examiner*—Paul J. Henon
*Assistant Examiner*—Sydney Chirlin
*Attorney*—Fulwider, Patton, Rieber, Lee & Utecht

ABSTRACT: Apparatus and method for analyzing and encoding graphical data into a serial character stream for transmission over a communications system to a remote data terminal where the character stream is decoded to generate a high resolution graphical display of the data. The graphical display is generated on a teletypewriter which has been modified to permit relatively small, positive and negative incremental movements of the typewriter type carriage and platen in their respective horizontal and vertical directions. The coding scheme include analyzing the graphical data on an incremental point-to-point basis to determine the quadrant of movement to the next point, the horizontal and vertical increments, and the symbol to be printed. The data is also analyzed to detect information which is invariable over a plurality of points and such information is commanded to be stored in the receiving remote data terminal. Thereafter, only variable information is transmitted to the remote terminal until one of the invariable items of information changes.

Alternate apparatus and methods are disclosed for further reduction of the transmission of invariable information and for suppressing the printing of symbols which contain graphing information.

INVENTOR.
ALLAN L. BUDD
BY Fulwider, Patton, Rieber, Lee, and Utecht
ATTORNEYS

| | MODE/QUAD | dx | dY | SYMBOL |
|---|---|---|---|---|
| MODE 1 | STORED | STORED | STORED | VARIABLE |
| MODE 2 | STORED | STORED | VARIABLE | STORED |
| MODE 3 | STORED | VARIABLE | STORED | STORED |
| MODE 4 | STORED | VARIABLE | VARIABLE | STORED |

Fig. 3

CHARACTER STREAM

| | 1 | 2 | 3 | 4 | 5 | 6 | 7 | 8 | 9 |
|---|---|---|---|---|---|---|---|---|---|
| MODE 1 | FLAG | MODE/QUAD | dx | dY | SYMBOL | SYMBOL | SYMBOL | SYMBOL | SYMBOL |
| MODE 2 | FLAG | MODE/QUAD | dx | dY | SYMBOL | dY | dY | dY | dY |
| MODE 3 | FLAG | MODE/QUAD | dx | dY | SYMBOL | dx | dx | dx | dx |
| MODE 4 | FLAG | MODE/QUAD | dx | dY | SYMBOL | dx | dY | dx | dY |

Fig. 4

INVENTOR.
ALLAN L. BUDD
BY Fulwider, Patton, Rieber, Lee, and Utecht
ATTORNEYS

PATENTED SEP 28 1971 3,609,701

INVENTOR.
ALLAN L. BUDD
BY Fulwider, Patton, Rieber Lee, and Utecht
ATTORNEYS

INVENTOR.
ALLAN L. BUDD
BY Fulwider, Patton, Rieber, Lee, and Utecht
ATTORNEYS

| | | | | | | | |
|---|---|---|---|---|---|---|---|
| 1 | 2 | 3 | 4 | 5 | 6 | 7 | 8 |
| FLAG | MODE 2/ QUAD 2 | dx | dy | SYMBOL | dy | dy | dy |
| 9 | 10 | 11 | 12 | 13 | 14 | 15 | 16 |
| dy | MODE 3/ QUAD 2 | dx | dy | SYMBOL | dx | dx | dx |
| 17 | 18 | 19 | 20 | 21 | 22 | 23 | 24 |
| dx | dx | MODE 3/ QUAD 3 | dx | dy | SYMBOL | dx | dx |
| 25 | 26 | 27 | 28 | 29 | 30 | 31 | 32 |
| MODE 1/ QUAD 3 | dx | dy | SYMBOL | SYMBOL | SYMBOL | SYMBOL | FLAG |
| 33 | 34 | 35 | 36 | 37 | 38 | 39 | 40 |
| MODE 2/ QUAD 2 | dx | dy | SYMBOL | dy | dy | dy | dy |

INVENTOR.
ALLAN L. BUDO
BY Fulwider, Patton, Rieber Lee and Utecht
ATTORNEYS

INVENTOR.
ALLAN L. BUDD
BY Fulwider, Patton, Rieber Lee, and Utecht
ATTORNEYS

DATA TERMINAL SYSTEM

BACKGROUND OF THE INVENTION

1. Field of the Invention

The present invention relates generally to data terminal systems and, more particularly, to such a system which can generate a high resolution graphical display of data as well as print textual material, all with the same type head.

2. Description of the Prior Art

In the field of data processing, it is often desirable to present the results of computer computations as a graphical display rather than as a tabulation or text. Therefore, many automatic plotters have been developed to accept data in digital form from a computer and generate a corresponding visual graph. In many cases, additional graphical information such as axes, lines, scales and labels may also be generated and plotted by the plotter.

Such digital plotters generally have a marking instrument such as a pen which is moveable over a flat surface along coordinate axes in response to digital data. In some cases, the marking instrument leaves a continuous track while, in other devices, a mark is left only at specified points. Also, for some digital plotters, the marking device is an impact-type printer and one of a limited font of symbols may be printed at each plotted point.

In some computer applications, such as time sharing, communication with the computer is made by means of a data terminal at a remote location. Ordinarily, the users of such data terminals in time sharing computer systems do not have a sufficient amount of data to be processed to warrant the expense of a complete computer system. For many such users, even a relatively inexpensive data terminal is, itself, a substantial investment.

In many cases, the data processed through such data terminals is also best displayed in graphical form. While digital plotters of the type discussed above generally perform quite well in graphing data, they are highly specialized units and tend to be relatively expensive compared to the cost of commonly used data terminals. Additionally, the digital plotter cannot be economically substituted for the data terminal and used to print textual material because of the complex programs needed in the computer to command a pen or stylus to "draw" an alphanumeric character. The amount of computer processing to print simple textual material then becomes prohibitively expensive and a great deal of time is required to generate each alphanumeric character. Impact printing plotters usually have a font of printable symbols far too small for printing text. Thus, for the average user of a time sharing data terminal, the ability to both produce a graphical display of data, and print textual material, is an expensive proposition if a conventional data terminal and digital plotter is employed.

Attempts have been made to solve this problem by utilizing the conventional data terminal equipment to produce graphical displays of data. Typically, a relatively inexpensive data terminal uses an input-output device in the form of a modified electric typewriter or a conventional teletypewriter. Such a machine can be used to produce a graphical display by properly programming the computer to command the operation of the typewriter or teletypewriter to print suitable symbols, such a period or asterisk, at appropriate points.

However, because of the relatively large and fixed incremental movements of such machines, the resultant graphical display is of relatively low resolution. Furthermore, the range of movement of conventional typewriters and teletypewriters is somewhat limited. For example, the line feed of such machines usually cannot be reversed, necessitating analysis and scanning of the graph to be generated from the top to the bottom. Such computer analysis consumes valuable computer processing time.

Conventional analysis and encoding schemes for both digital plotters and typewriters or teletypewriters generally transmit complete information regarding each new point to be plotted. This results in a great deal of invariable information being transmitted. Since a speed limiting factor for many data terminal systems using telephone lines is the transmission rate of the line, the transmission of the invariable information results in the graphical display being generated relatively slowly.

Thus, there has long been a need in the data processing field for a data terminal system which could quickly, economically and reliably produce high resolution graphical displays of data as well as print textual material. The apparatus and method of the present invention fills this need.

SUMMARY OF THE INVENTION

Basically, the present invention provides a data terminal system which can produce either conventional text or a high resolution graphical display in an efficient and economical manner. The system of the invention is particularly useful in data processing systems in which data in a central computer is to be transmitted to, and reproduced at, a remote data terminal, either as printed text, as a graphical display or as a combination of both.

One novel feature of the presently preferred embodiment of the invention is the use of an output device in the form of a conventional teletypewriter in which the type carriage and line feed drive mechanisms have been replaced by stepping motors which can incrementally move the type carriage and platen a distance considerably less than the normal width of a space or line, respectively. The points on a graphical display can, therefore, be placed relatively close together for a high resolution display. Additionally, the stepping motors can be easily operated in positive or negative rotational directions to follow the course of any curve or plot. The type carriage of the teletypewriter used with the present invention is also provided with an electromechanical actuator to physically suppress the printing of a received character which has graphical rather than textual significance. Alternately an electrical print suppress scheme may be used.

Another novel feature of the data terminal system of the present invention includes the use of a unique data analyzing and encoding scheme to substantially reduce the number of characters which must be transmitted to a remote terminal for point-to-point movement of the type carriage and platen of the teletypewriter. The length of the character stream needed to generate a complete graph is thereby greatly reduced, decreasing the time needed to generate the graph and, consequently, also decreasing the cost of the computer time needed when operating in a time sharing system.

The number of characters needed to move the type carriage and platen from one point to another is initially reduced by combining both of the positive or negative signs of the respective horizontal or vertical movements of of the carriage and platen into a single item of information indicative of one of the four well-known quadrants of conventional rectangular coordinate axes. Thus, one of the two characters needed to transmit both of the signs is eliminated, reducing the number of characters which must be transmitted.

The number of characters which must be transmitted for each point is further reduced by the system of the present invention by analyzing the data to determine if any of the quadrant, horizontal or vertical increment, or the symbol to be printed is invariable from point-to-point. If so, the invariable information is transmitted to the remote terminal together with an appropriate command signal that such invariable information be stored in the remote terminal. Thereafter, only the variable information is transmitted to the remote terminal. The complete information for movement between points is then taken from the stored invariable information and the received variable information until one of the stored items of invariable information changes. The stored items of information are then appropriately changed. Thus, for some types of movements of the type carriage and platen, only one of the items of information needed for point-to-point movement need be transmitted, thereby greatly reducing the length of the character stream and the time required to generate the graph.

In the coding scheme utilized in the graphing data terminal system of the present invention, when one or more of the stored invariable items of information changes, all of the items of information are retransmitted to the remote terminal with an appropriate storage command signal indicative of a particular mode of the operation. To reduce the number of characters which must be transmitted in such a case, the command signal is combined with the quadrant information to form a mode-quadrant character. The mode and quadrant information are then separated in the remote terminal.

An additional feature of the coding scheme of the invention is the use of only alphanumeric symbols for all of the graphing as well as textual information. Since substantially all computer systems must accept such alphanumeric symbols, the graphing data terminal system of the present invention is thus compatible with practically any computer system.

The exclusive use of alphanumeric characters results in another novel feature of the invention. In an alternative coding scheme, the horizontal and vertical distances are restricted to the numeric characters only so that a alphabetic character may be simply interpreted as a mode-quadrant character.

Thus, in summary, the graphing data terminal system of the present invention includes a modified teletypewriter mechanism to permit relatively small incremental movement of the type carriage and platen in either positive or negative directions so that typing and plotting can be accomplished with a single type head with the printing of received characters being suppressed when the characters have graphical rather than text significance. The length of the character stream needed for point-to-point movement is greatly reduced by transmitting a single mode-quadrant character to set the mode of operation and the quadrant of movement. Additionally, the graphical data is analyzed on a point-to-point basis to determine invariable information which is then commanded to be stored in the remote terminal and only variable information transmitted thereafter.

Other objects and features of the graphing data terminal system of the present invention will become apparent when the following more detailed description is considered together with the drawings.

BRIEF DESCRIPTION OF THE DRAWINGS

Fig. 3 is a tabulation of the stored invariable and transmitted variable information of the initial character stream for the four modes of operation of the system;

FIG. 4 is a representation of the graphing information contained in an illustrative serial character stream for the four modes of operation of the data terminal system of the invention;

DESCRIPTION OF THE PREFERRED EMBODIMENT

Figure 1:
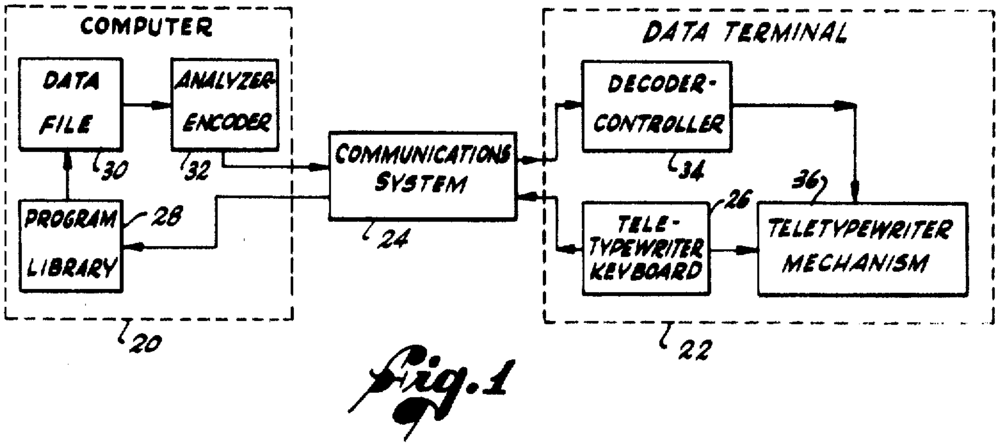
Fig. 1 is a block diagram of the data terminal system of the present invention showing the interconnection of major operative elements thereof.

Turning now to the drawings, particularly FIG. 1 thereof, the data terminal system of the present invention is designed primarily for use in a time sharing computer system with a computer 20 connected to a remote data terminal 22 through a communications system 24. Typically, the communications system 24 is a part of a telephone network, using either dedicated lines or simple voice grade telephone lines.

Basically, when the presently preferred embodiment of the data terminal 22 of the present invention is connected to the computer 20, data instructions are transmitted to the computer by means of a teletypewriter keyboard 26. However, it should be appreciated that data can be transmitted by other means, such as a paper tape reader, or the like. Typically, the computer 20 will be commanded to follow the instructions of a particular program in a program library 28 which is available to users of the computer system. Typically, the program library 28 contains programs for making calculations or processing data supplied by the user of the terminal. In the system of the present invention, when it is desired to present the results of the calculations or processed data in graphical form, additional instructions are given to the computer to assemble the results in a data file 30. Additionally, data in tabular form may be entered into the computer 20 from the data terminal 22 for assembly in the data file 30.

Data for printing labels, graphing axes, scales and other information needed to generate a complete graph are supplied by conventional auxiliary programs in the program file 28 and forms no part of the present invention. The data file 30, therefore, contains a point-by-point listing of every point to be plotted on the graphical display.

An analyzer-encoder 32 then examines each point in the data file 30 in turn and assembles a coded character stream according to a coding scheme which is a part of the present invention. Each character of the stream represents either graphing information, or text material to be printed, depending on the analysis of the analyzer-encoder 32, as discussed below. The character stream is transmitted through the communications system 24 to the data terminal 22 where it enters a decoder-controller 34 which generates suitable electrical signals for incrementally moving a teletypewriter mechanism 36 from point-to-point and printing at each point any of the plurality of symbols available in the teletypewriter mechanism 36. The teletypewriter mechanism 36 may be commanded to print textual material or generate graphical displays with equal facility.

Figure 2:
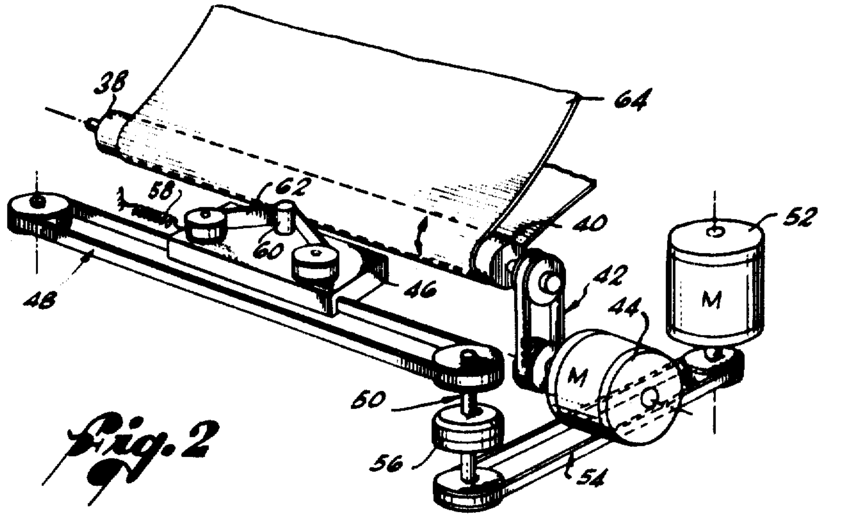
Fig. 2 is a diagrammatic, perspective view of a teletypewriter mechanism showing the main elements thereof which are modified in accordance with the present invention.

A teletypewriter was chosen for the combined printing and graphing mechanism of the data terminal system of the present invention for reasons of economy. However, while a teletypewriter is an excellent low speed text printing device, the incremental movements of the type carriage drive and platen line feed mechanisms are much too large for high resolution graphing purposes. Therefore, the teletypewriter of the present invention is modified as shown in Fig. 2. The line feed drive for a platen 38 of the teletypewriter is modified so that it is driven about one end 40, through a first belt and pulley arrangement 42 by a first stepping motor 44. A type carriage 46 of the teletypewriter remains conventionally driven by a second belt and pulley arrangement 48. However, a drive shaft assembly 50 of the type carriage 46 is modified to be driven by a second stepping motor 52 and a third belt and pulley arrangement 54 through a clutch 56. The clutch 56 is selectively engageable by means of a conventional solenoid (not shown) so that the type carriage 46 can be returned to the left margin by means of a spring 58.

The type carriage conventionally carries a type head 60 which is selectively driven into contact with a typing ribbon 62 and thence into contact with a sheet of paper 64 wound around the platen 38. The typing character selection mechanisms of the teletypewriter are not modified in the system of the present invention.

By proper choice of the first and second stepping motors 48, 52 and the first and third belt and pulley arrangements 42, 54, respectively, the platen 38 and type carriage 46 may be moved relatively small incremental distances in either positive or negative directions for each fixed incremental rotation of the motors. In the presently preferred embodiment of the invention, each incremental movement was chosen as 0.02 inches. This value was chosen so as to be able to print a substantially continuous line with the smallest symbol which could be printed, the peroid (.). Thus, it can be seen that a high resolution graph can be generated using the stepping motors.

The maximum number of increments between points in either the horizontal or vertical directions of the type carriage 46 or platen 38 respectively, (hereinafter called a "step") was set at 15 so that the movements could occur and the symbol printed before the next character arrived at the data terminal 22. It should be appreciated that the increment spacing and step size can be chosen to fit particular computer systems and data terminals.

In the system of the present invention, the data in the data file 30 is analyzed on a point-to-point basis so that the horizontal and vertical movement information is representative of the incremental distance between points, as opposed to the respective distances from some fixed reference lines. Thus, the horizontal and vertical incremental distances from a current point to a new point (designated *dX* and *dY*, respectively, according to convention) are in the incremental form required by the drive mechanisms of the stepping motors 44, 52 so that further analysis or calculation within the data terminal 22 is unnecessary. The *dX*, *dY* and symbol information is then converted to suitable coded characters, such as the American Standard Code for Information Interchange (ASCII), which can be transmitted to the data terminal 22 over the communications system 24.

It should be appreciated that there is no feedback from the receiving data terminal 22 to the analyzer-encoder 32 of FIG. 1 so that commanded movements of the type carriage 46 and platen 38 are assumed to have taken place. The incremental movement from point-to-point and the open-loop type of operation greatly simplifies the system of the invention for economy.

It will be understood that five separate items of information are required to move from a current point on the graph to a new point and print a symbol. In particular, the sign and value of the horizontal increment, the sign and value of the vertical increment and the symbol which is to be printed are all necessary.

In the data terminal system of the present invention, one of these five items of information is eliminated by referencing the signs of the horizontal and vertical increments *dX* and *dY*, respectively, to the well-known four quadrants of conventional rectangular coordinate axes. The sign information of both *dX* and *dY* is combined into a single item of quadrant information, thereby eliminating one transmitted character for each point-to-point movement. It will be appreciated that this substantially reduces the length of the character stream needed to generate the entire graphical display. This not only greatly increases the speed in which a graph can be generated, but also substantially reduces the cost of the computer processing time in time sharing systems.

Additionally, it will be appreciated that, for particular types of graphing or text printing operations, a number of the items of information may remain invariable over a plurality of points. For example, it can be seen that if the terminal is to print textual material, the signs of both *dX* and *dY* between printed symbols is invariable over an entire line of text, the spacing (*dX*) between the printed symbols is invariable and the vertical movement (*dY*) is zero so that *dY* is also invariable. Thus, the only item of information which varies from point-to-point is the symbol which is to be printed.

In the data terminal system of the present invention, great advantage is taken of the fact that certain of the items of information remain invariable for a plurality of points by transmitting the items of invariable information to the data terminal only once and commanding their storage therein. Thereafter, only the items of variable information for each point are transmitted to the data terminal. The five necessary items of information needed for movement from point-to-point are then taken from both the received variable information and the stored invariable information. Thus, in the above example, the quadrant information, the *dX* information and the *dY* information would be transmitted to the data terminal and stored. Thereafter, each received character would represent only the symbol to be printed. For the cited example, it can be seen that only one of five items of information need be transmitted for each point once the invariable information is stored in the data terminal. The coding scheme of the present invention thereby greatly decreases the length of the character stream for speed and economy, as discussed above.

The data terminal of the system is commanded to store particular items of information by means of one of four mode signals generated by the analyzer-encoder of FIG. 1. The mode signals indicate the four modes of operation of the system of the invention. The characteristics and advantages of the four operating modes are discussed below.

Whenever any of the items of stored information changes, the complete combination of quadrant, *dX*, *dY* and symbol information is retransmitted, with the appropriate changes, to the data terminal 22. In order to decrease the number of characters which must be transmitted to the data terminal, the appropriate mode signal is advantageously combined with the quadrant information to form a single transmittable mode-quadrant (abbreviated mode-quad or mode/quad in the drawings) character. The received mode-quadrant character is separated into its mode and quadrant component parts in the decoder-controller 34 of the data terminal 22 of FIG. 1.

FIG. 3 illustrates, in tabular form, the format of the stored invariable and variable information for the four modes of operation of the system. The printing of textual material, discussed above as an example, is designated as mode 1 for the presently preferred embodiment of the invention. Additionally, three other modes are provided for the other commonly encountered operating conditions in graphing operations.

As another example of a mode of operation, if a curve is to be printed which is slowly varying in the vertical direction for equal horizontal increments, the quadrant, the *dX* value and the symbol (perhaps a period (.)) to be printed will be invariable over the curve. As will be seen from a consideration of in FIG. 3, the proper mode of operation would be mode 2 in which the received mode-quadrant, *dX* and symbol characters are stored leaving *dY* as the only variable.

As seen in FIG. 3, the variable character for mode 3 is *dX* and, for mode 4, both the *dX* and the *dY* characters are designated as variables. Mode 3 might be used, for example, when the graph is based on equal vertical increments rather than the previously considered equal horizontal increments and mode 4 might be used when a relatively smooth curve is being generated which is moving in the same quadrant but which has variable *dX* and *dY* values, or when the proper mode has not yet been determined.

As discussed above, when any of the items of stored information change a complete character sequence consisting of the mode-quadrant, *dX*, *dY* and symbol characters is transmitted to the data terminal 22. The first character received, the mode-quadrant character, is stored and conditions the decoder-controller 34 (FIG. 1) to store the appropriate subsequently received characters, depending on the mode of operation. Thereafter, the only characters which are transmitted to the data terminal 22 are the characters designated as variable for the particular mode. The data terminal 22 then moves the type carriage 46 and platen 38 to a new position and prints a symbol in accordance with the received variable information and the stored invariable information.

In the presently preferred embodiment of the invention, the only transmitted characters which have significance as mode-quadrant, *d*X, *d*Y and symbol information are the alphanumeric characters, and their significance depends on their position in the initial character stream. Once the initial character stream is stored, however, the data terminal cannot distinguish between received characters as being variables or part of a new character stream to be stored. Thus, in one embodiment of the system of the present invention, a special character which is not alphanumeric, called the "flag" character is transmitted to the data terminal 22 to condition the terminal to receive the next four characters as mode-quadrant, *d*X, *d*Y and symbol characters and store the appropriate characters depending on the mode of operation. The flag character may be any nonalphanumeric character which can be handled and generated within the particular computer used with the present system. Because the American Standard Code for Information Interchange (ASCII) is extensively used in time sharing applications, a character commonly used in this code, the "up arrow," is designated to serve as the flag character in the presently preferred embodiment of the invention. It should be noted, however, that any nonalphanumeric character can serve the same function, depending on particular computers and applications.

The particular character stream combinations for entering the various modes are illustrated in FIG. 4. For mode 1, for example, the first received character is the flag character which conditions the data terminal 22 of FIG. 1 to attach special significance to the next four received characters. Therefore, the second character to be received is the mode-quadrant character which is stored and thereafter conditions the data terminal 22 to store the next two received characters as the *d*X and *d*Y values, respectively. Following the receipt and storage of the third and fourth characters, the *d*X and *d*Y values, respectively, the fifth received character indicates the symbol to be printed. The next received characters, the sixth, seventh, eighth and ninth characters, are all interpreted by the data terminal as symbols to be printed. The *d*X, *d*Y and quadrant information needed for movement to the new point are all taken from the previously stored characters.

For mode 2, the variable is the *d*Y value and, following the receipt of the flag character, the mode-quadrant character conditions the data terminal to store the *d*X and symbol characters, but treats the *d*Y character as a variable. Therefore, following thereceipt of the fifth symbol character, the data terminal interprets the sixth, seventh, eighth, and ninth character as variable *d*Y values and the type carriage 46 and platen 38 are moved accordingly. The same stored symbol is then printed following each movement.

For mode 3, the *d*X is treated as a variable, as discussed above. Therefore, following the receipt of the flag character, the mode-quadrant, *d*Y, and symbol characters are stored and the *d*X character is treated as a variable. The sixth, seventh, eighth and ninth received characters are then received as variable *d*X values.

For mode 4, both *d*X and *d*Y are treated as variables, as discussed above. Therefore, following the receipt of the flag character, only the mode-quadrant and symbol characters are stored and the sixth, seventh, eighth and ninth received characters are alternately treated as *d*X and *d*Y values.

It should be appreciated that once a flag character is received and the appropriate characters are stored, the system remains in that particular mode until at least one of the stored characters must be changed. Then, another flag character is generated and the stored information is modified accordingly.

It can also be seen that once the invariable information is stored, a movement of the type carriage 46 and platen 38 to print a symbol requiring five items of information can be accomplished with the transmission of only one character instead of five, if the system is in modes 1,2 or 3, and with only two transmitted characters for mode 4. It will be appreciated that a high resolution graph normally contains a considerable number of points, when the axes and scales are considered and, when voice grade telephone lines are used, the graphical information must be transmitted relatively slowly. Therefore, if all five items of information had to be transmitted to move from one point to the next, the graph would be generated quite slowly. Thus, if a number of points can be graphed by transmitting only one character for each point, as can be done with the data terminal system of the present invention, the graph can be generated much faster and more economically.

Figure 5:
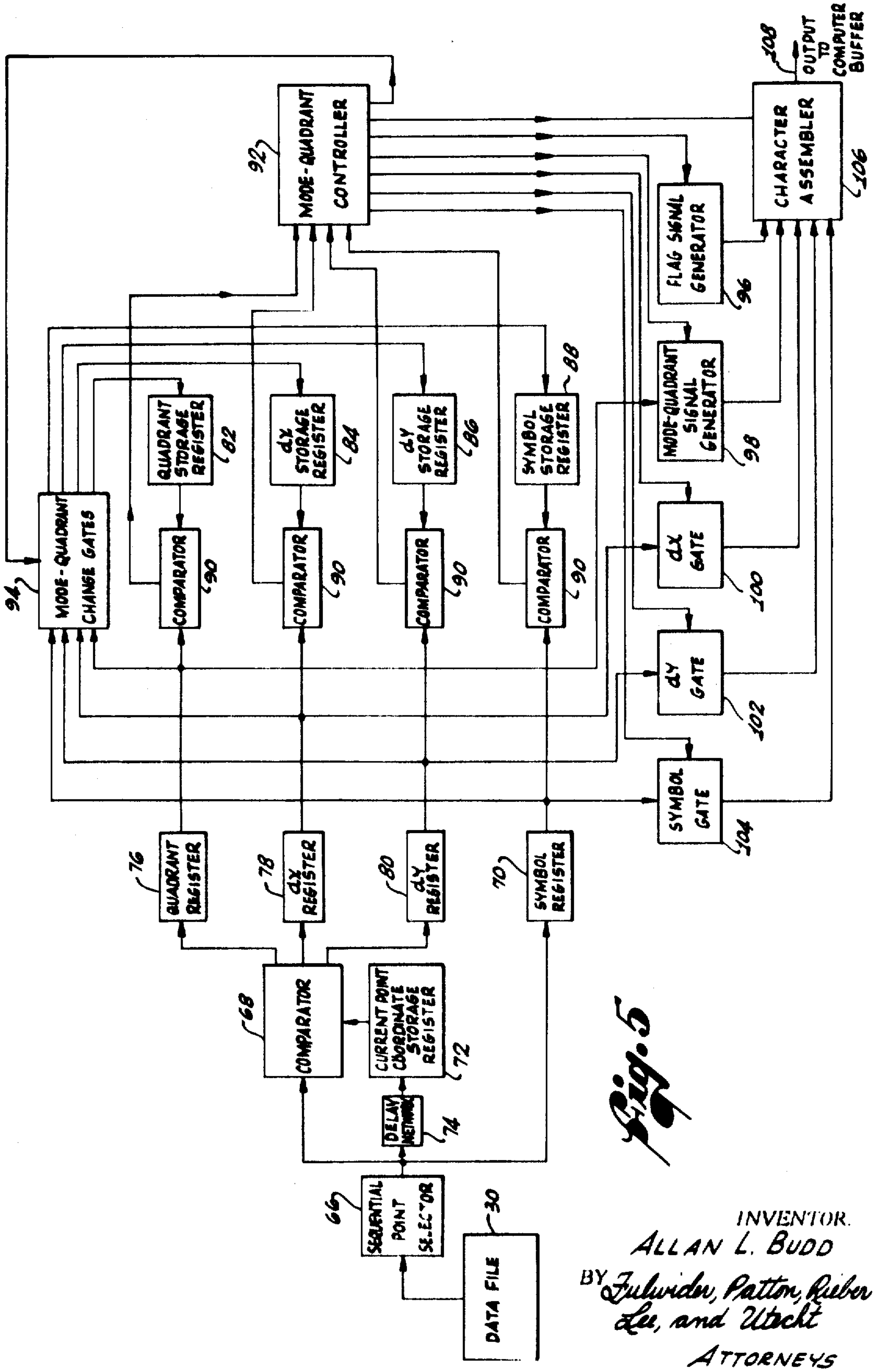
Fig. 5 is a block diagram of an illustrative analyzer-encoder for generating the character stream to be transmitted to the remote terminal of the system.

In the presently preferred embodiment of the invention, the analyzing and encoding operation of the analyzer-encoder 32 of FIG. 1 is preferably accomplished by means of a series of programmed steps within the computer 20, as opposed to separate hardware. While a wide variety of programs and schemes may be used to analyze and encode the graphical data, an illustrative block diagram of the basic operation of the encoder-analyzer 32 is shown in FIG. 5. Basically the encoder-analyzer examines each point in turn and compares it with the state of the stored characters in the data terminal 22. If one of the stored characters changes, the analyzer-encoder 32 generates a complete character stream beginning with a flag character. If the stored characters are the same, only the item of information treated as a variable is transmitted.

Generally, graphical and textual data contained in the data file 30 is selected on a point-to-point basis by a sequential point selector 66 which then transfers the coordinate information to a comparator 68 and the symbol information to a symbol register 70. The coordinates of the previously examined point are the coordinates of the current position or point on the graph and are stored in a current point coordinate register 72 after passing through a suitable time delay network 74 connected to the sequential point selector 66. The coordinates of the new point are then compared with the coordinates of the current point. The quadrant of movement is determined and transferred to a quadrant register 76, the incremental X axis difference (*d*X) between the two points is determined and transferred to a *d*X register 78 and the Y axis difference (*d*Y) is determined and transferred to a *d*Y register 80.

According to the coding scheme of the present invention, the quadrant, *d*X, *d*Y and symbol information for the new point to be plotted is then compared with the corresponding information which is stored in the receiving data terminal for a particular mode of operation to determine whether a change in the stored information is necessary. As discussed above, there is no feedback between the analyzer-encoder 32 and the decoder-controller 34 of FIG. 1. Therefore, duplicate quadrant, *d*X, *d*Y and symbol storage registers 82, 84 86 and 88, respectively, are provided in the analyzer-encoder to duplicate the stored information in the decoder-controller 34.

Each of the quadrant, *d*X, *d*Y and symbol information for the new point contain ed in the registers 76, 78, 80 and 70, respectively, is then compared by means of a comparator 90 with the information in the corresponding storage registers 82, 84, 86 and 88, respectively, to determine whether the stored information in the decoder-controller 34 has to be changed. For example, if the quadrant information entered in the register 76 is different than the quadrant information stored in the quadrant storage register 82, the comparator 90 sends a signal to a mode-quadrant controller 92. The controller 92 then signals a plurality of mode-quadrant change gates 94 to gate the new quadrant information through the change gates 94 to the quadrant storage register 82. In the same manner, the *d*X, *d*Y and symbol information is compared with the stored information and the stored information is changes if necessary. It should be noted that differences between the variable item of information for the particular mode of operation and the stored information for that item does not cause the mode-quadrant controller to change the stored information.

The mode quadrant controller also signals a flag signal generator 96, a mode-quadrant signal generator 98, and *d*X, *d*Y, and symbol gages 100, 102, 104, respectively, to selectively gate the information in the quadrant, dX, dY and symbol registers 76, 78, 80 and 70, respectively, to a character assembler 106. Which of the dX, dY and symbol gates 100, 102, and 104, respectively, are enabled depends on the particular mode of operation. The character assembler 106 provides a proper sequential output 108 to the computer output buffer for transmission to the data terminal 22, as discussed above. It should be noted that, if none of the stored information has to be changed, the mode-quadrant controller 92 enables only the dX, dX or symbol gate 100, 102, 104, respectively, which is associated with the information which is considered variable for the particular mode in which the system is operating.

As discussed above, the illustrated analyzing and encoding scheme shown in FIG. 5 is only representative of the type of data analyzing and encoding needed to generate the desired character stream. Additionally, it will be appreciated that the analysis and encoding for the presently preferred embodiment of the invention is accomplished by means of an analytical method suitable for implementation as a program within the computer itself. A suitable method for encoding the data in the data file is described in copending U.S. Pat. application Ser. No. 20494, filed on March 18, 1970 entitled METHOD OF ENCODING GRAPHICAL DATA, and invented by George Kurata. Reference is made to this copending application for further details concerning the actual scheme of analyzing and encoding in the data file.

Figure 6:
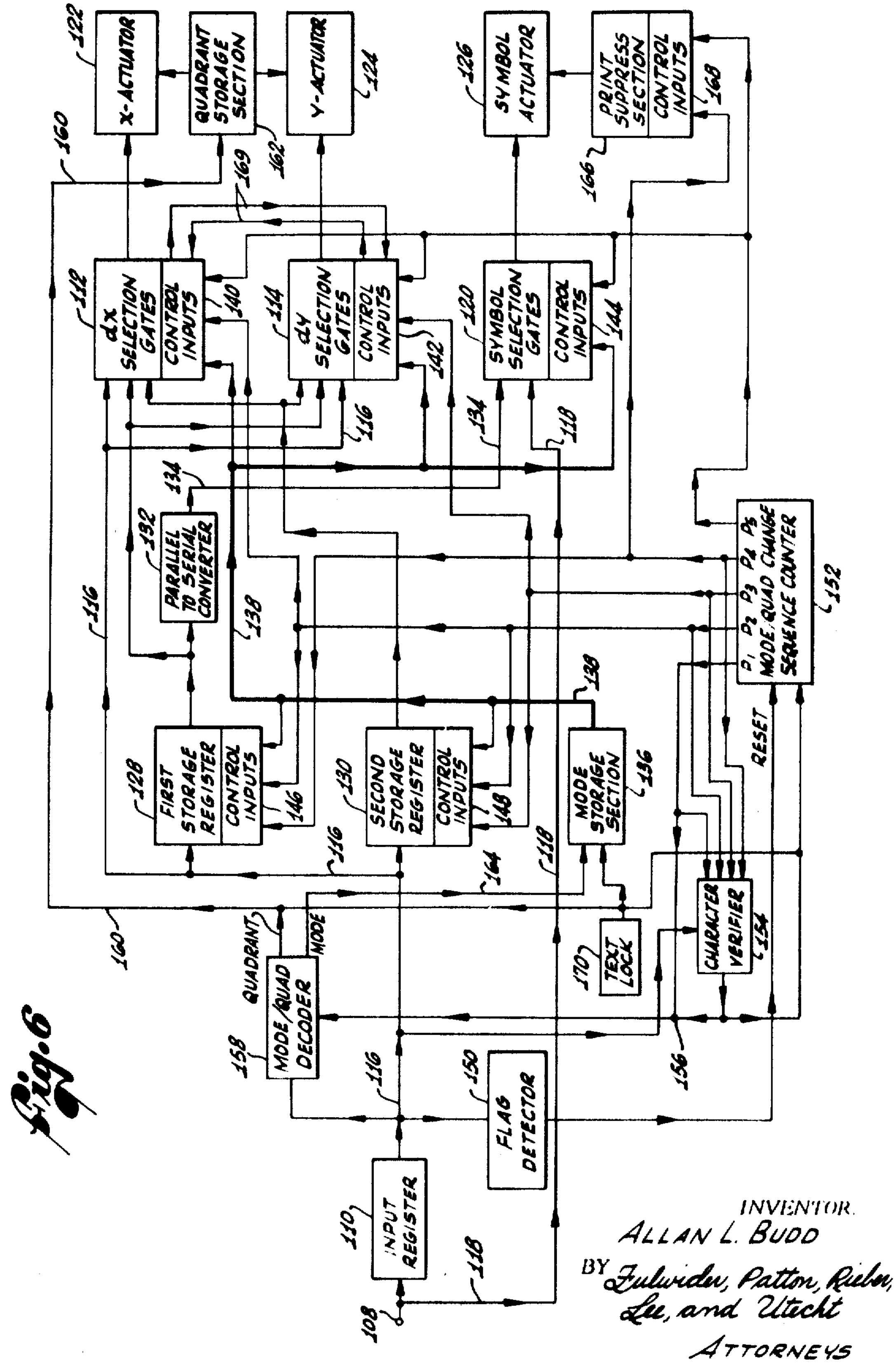
Fig. 6 is a functional block diagram of the presently preferred embodiment of the decoder-controller of the system of the present invention.

An illustrative block diagram of the presently preferred embodiment of the decoder-controller 34 of FIG. 1 as shown in FIG. 6. Generally, the characters received from a communications line 108 are serially entered into a conventional input register 110 at a relatively slow speed. Thereafter, the character is processed in parallel through the decoder-controller 34 at a relatively high speed. When the serial receipt of a character is completed, the equivalent of a "clock" signal is generated, through conventional circuitry within the input register 110, which initiates and controls the parallel processing of the character through the decoder-controller 34.

The operation of the decoder-controller 34 is best described by means of a series of examples. First, assume that the received character is not a flag character and that the system is properly operating in a particular mode. The received character in the input register 110 is then treated as the variable item of information and is fed to respective dX and dY selection gates 112 and 114, respectively, via a general input line 116. Additionally, the inputs from the communications line 108 is fed directly on a serial input line 118 to symbol selection gates 120. The inputs to the dX and dY selection gates 112 and 114, are thus in parallel while the inputs to the symbol selection gates 120 are in serial form. This difference is due to the fact that the teletypewriter type head mechanism requires a serial data input.

Depending on the operating mode, one of the three selection gates 112, 114, 120 is enabled to feed the received character in parallel to an X or a Y actuator 122, 124, respectively, or serially to a symbol actuator 126. The remaining two of the three selection gates 112, 114 and 120 are enabled to feed a character stored in either a first or second storage register 128, 130, respectively, depending on the operating mode. In the presently preferred embodiment of the invention, the dX and dY selection gates 112, 114 may receive inputs from either the first or second storage registers 128, 130, respectively. However, the symbol selection gates 120 must receive data in serial form and a single parallel to serial converter 132 is connected to the output of the first storage register 128 only. The symbol selection gates 120 can then receive the proper serial inputs from only the first storage register 128. A serial output of the converter 132 is thus fed to the symbol selection gates 120 via a line 134.

The X and Y actuators 122, 124 are conventional devices for operating the stepping motors 44 and 52 discussed above with reference to FIG. 2. The symbol actuator 126 includes the electromechanical mechanisms provided within the teletypewriter itself together with any required conventional matching circuitry. The dX, dY and symbol selection gates 112, 114 and 120 are selectively enabled by means of mode signals from a mode storage selection 136 which has four outputs combined for clarity in FIG. 6 into a single mode signal line 138. The mode signals are applied to control inputs 140, 142 and 144 associated with each of the respective selection gates 112, 114 and 120. It should be understood that the dX, dY and symbol selection gates 112, 114 and 120, as well as the control inputs 140, 142 and 144, are conventionally designed logic gating networks. Also, the first and second storage registers 128 and 130, as well as associated control inputs 146 and 148 for these registers, are conventionally designed.

As a second example, assume that one or more items of the stored information is to be changed. The incoming character streams for the four modes of operation would then be in the orders shown in FIG. 4.

A flag character is serially read into the input register 110 and its presence is detected by flag detector 150, in the form of conventional logic gates, which resets a mode-quadrant change sequence counter 152. The sequence counter 152 is conventionally designed and controls the storage of the subsequently received characters, depending on the mode. Therefore, the counter 152 generates P1 through P5 signals in sequence with subsequently received characters. When the counter 152 reaches the P5 signal, all characters received thereafter are designated as variable. The P5 signal conditions the dX and dY symbol selection gates 112, 114 to accept inputs from either the general input line 116 or one of the first and second storage registers 128, 130, respectively, depending on the mode of operation. The P5 signal also conditions the symbol selection gate 120 to accept inputs from either a serial input line 118 or the first storage register 128 through the parallel to serial converter 132.

In the presently preferred embodiment of the invention, particular groups of the alphanumeric characters are chosen to represent mode-quadrant, dX, dY and symbols. The accuracy of the incoming stream can be at least partially checked by means of a character verifier 154 which examines the character on the general input line 116 with respect to the P1 through P4 signals from the sequence counter 152 to determine if the proper types of characters are received in the proper sequence. If not, an output 156 inhibits the sequencing of the sequence counter 152 and further disables any operation on the received incorrect character.

When the mode-quadrant character is received, the counter 152 generates the P1 signal which enables a mode quadrant decoder 158 to separate the quadrant and mode information. The quadrant information is fed over a line 160 to a quadrant storage section 162 which controls the X and Y actuators, 122, 124, for movement in the proper positive or negative X and Y directions. The mode information is fed over a line 164 to the mode storage section 136 which conventionally generates mode signals indicative of a particular mode, as discussed above.

Because it is possible for the incoming mode-quadrant character to pass through the symbol selection gates 120 to the symbol actuator 126 where a meaningless alphanumeric symbol would be printed, a print suppress section 166 is provided to selectively inhibit the operation of the type head mechanism of the teletypewriter. The print suppress section 166 has associated control inputs 168 which receives disabling inputs from the P4 and P5 signals only. Thus, any character received by the symbol actuator 126 through the symbol selection gates 120 while the mode-quadrant, dX and dY characters are being received will not be printed.

The mode signals on the mode signal line 138 are fed to the control inputs 146, 148 of the first and second storage registers 128, 130, respectively, to condition the registers to store the appropriate subsequently received characters when the registers are enabled by the appropriate signals from the sequence counter 152. The mode signals are also fed to the dX, dY and symbol selection gates 112, 114, 120 to condition the gates to feed either the general input line 116, the serial input line 118 or the characters stored in the first and second storage registers 128, 130 to the respective actuators 122, 124 and 126, depending on the mode.

It should be noted that, since the quadrant information is stored in the quadrant storage section 162, only two of the three remaining items of information, dX, dY and the symbol, can be stored in the first and second storage registers 128, 130 because one of the items serves as a variable for modes 1, 2 and 3. For mode 4 only the symbol is stored because both dX and dY are treated as variables. In the decoder-controller 34 of the present invention, the symbol is always stored in the first storage register 128, as discussed above. Therefore, the mode 2, the dX character is stored in the remaining second storage register 130 while the dY character is stored therein for mode 3. For mode 1, the dX character is stored in the first storage register 128 and the dY character is stored in the second storage register 130 in the presently preferred embodiment of the invention. It will be appreciated, however, that other storage assignments could be made for the information to be stored.

When the dX character is received, the P2 signal from the sequence counter 152 enables the first and second storage registers 128, 130 and, if the system is in mode 1 the dX character is stored in the first storage register. However, if the system is in mode 2, the dX character is stored in the second storage register 130. In mode 4, the dX character is not stored in either storage register, as discussed above. The dX character is simultaneously fed through the dX selection gates 112, also enabled by the P2 signal, to the X actuator 122.

When the dY character is received in the input register 110, a P3 signal from the sequence counter 152 enables the second storage register 130 and the dY selection gates 114. The dY character is stored if the system in in modes 1 or 3 and the enabled dY selection gates 114. When the symbol character is received in the input register 110, the P4 signal from the sequence counter 152 enables the first storage register 128 to store the symbol if the system is in modes 2, 3 or 4. The P4 signal is also fed to one of the control inputs 168 to disable the print suppress section 166 to allow the symbol to be printed.

The mode-quadrant sequency counter 152 then generates a continuous P5 signal which is applied to the control inputs 140, 142, 144 of the dX, dY and symbol selection gates 112, 114, 120, respectively, and also to one of the control inputs 168 to the print suppress section 166 to continuously enable the gates and disable the print suppress section. The combination of the P5 signal and the mode signal applied at the control inputs 140, 142, 144 of the dX, and dY and symbol selection gates 112, 114, 120, respectively, determine whether the respective inputs to the gates will be taken from the general input line 116, the serial input line 118, or from one of the storage registers 128, 130. Additionally, a pair of feedback lines 169 interconnect the control inputs 140, 142 to the dX and dY selection gates 112, 114, respectively, to condition the gates to alternately receive the incoming variable character as a dX character and a dY character for mode 4.

The data terminal system of the present invention can be conditioned to operate substantially like a conventional, controlled teletypewriter by means of a text lock 170, which is preferably manually operated. When the text lock 170 is activated, the mode storage section 138, the quadrant storage section 162, the first and second storage registers 128, 130 and the mode-quadrant sequence counter 152, are "locked" in appropriate conditions for receiving and printing textual material.

In an alternate coding scheme for the data terminal system of the present invention, a mode-quadrant character is restricted to alphabetic characters only and the dX and dY characters are restricted to the numeric characters. When the transmitted variable is dX or dY, therefore, any alphabetic character which is received can be treated as a mode-quadrant character directly so that no flag character is needed. It will be appreciated that the flag character is then eliminated from the character stream for increased speed and economy of time. However, it should be noted that, if the system is operating in mode 1, the variable transmitted could validly be an alphabetic character and the flag signal is needed to change the system from mode 1 to another mode.

Figures 7, 8:
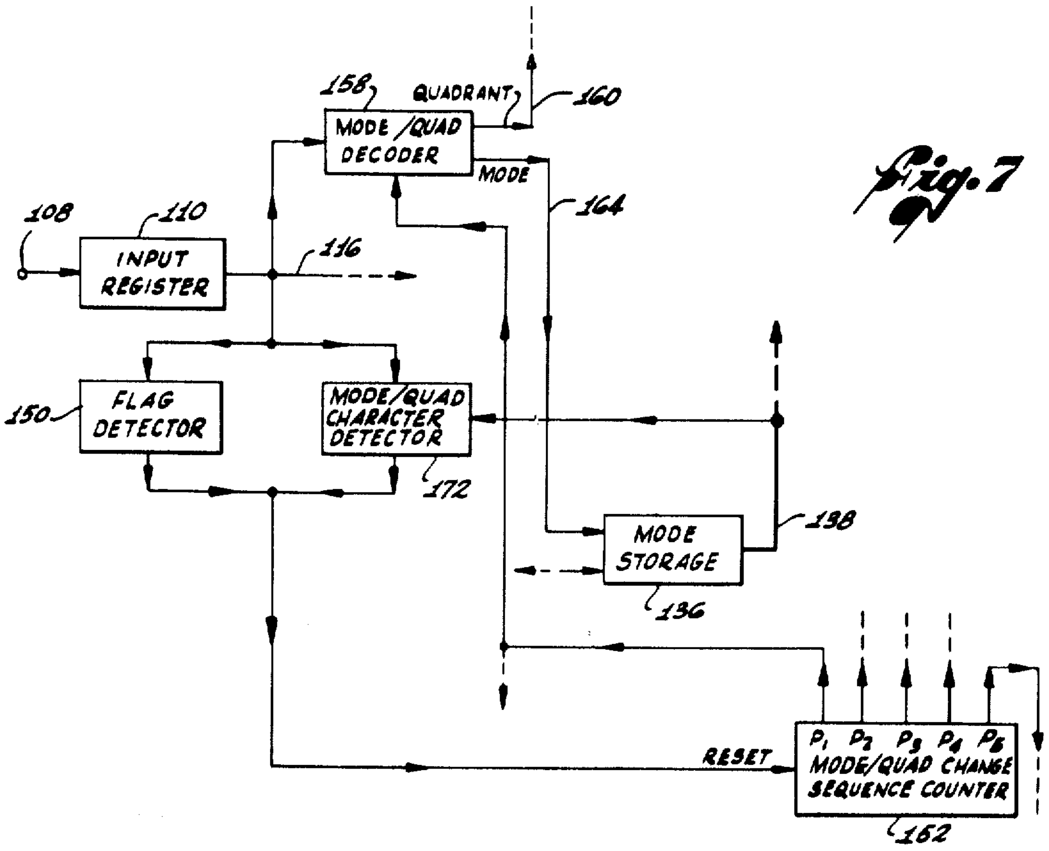
Fig. 7 is a partial block diagram of an alternative embodiment of the decoder-controller of the system shown in FIG. 6.
Fig. 8 is a representation of the graphing information contained in an illustrative serial character stream for the alternate embodiment of the decoder-controller shown in FIG. 7.

FIG. 7 is a partial block diagram of the decoder-controller of FIG. 6 and shows and added mode-quadrant character detector 172 controlled by the mode storage section 136 for receiving character streams using the alternate coding scheme. Basically, the mode-quadrant character detector 172 detects alphabetic characters and its effect is equivalent to that of the flag detector in that it resets the mode-quadrant change sequence counter 152 (FIGS. 6 and 7) and the operation proceeds as described above. If the system is in mode 1, however, the variable characters received by the input register 110 could validly be alphabetic characters and the mode-quadrant character detector 172 would generate erroneous reset signals. Therefore, when the system is in mode 1, the mode storage section 136 disables the mode-quadrant character detector 172 and the mode-quadrant change sequence counter 152 can only be reset by the flag detector 150.

FIG. 8 shows an example of a character stream utilizing the alternate coding system described above. Initially, a flag character conditions the receiver to store the appropriate characters and set the system in a particular mode. Thus, in the example the second character is a mode 2, quadrant 2 character which sets the system in mode 2. The third, fourth and fifth characters are the dX, dY and symbol characters, as discussed above. Since the system is in mode 2, all characters received thereafter will be considered as variable dY characters, such as the sixth, seventh, eighth, and ninth received characters. If a mode change is required, only the mode-quadrant character need be transmitted, such as the 10th received character, which conditions the system for mode 3, quadrant 2. The 11th, 12th and 13th characters are received as dX, and dY and symbol characters, as discussed above. Since the system is in mode 3, subsequently received characters are interpreted as variable dX characters, such as the 14th, 15th, 16th, 17th and 18th characters. Again, if a mode change is required, only a mode-quadrant character need be transmitted, such as the 19th character. The 19th mode-quadrant character conditions the system for mode 3, quadrant 3 and the 20th, 21st and 22nd character are again interpreted as dX, dY and symbol characters. Since the system remains in mode 3, the subsequently received 23rd and 24th characters are interpreted again as variable dX characters.

The 25th character sets the system for operation in mode 1, quadrant 3 and the 26th, 27th, and 28th characters are interpreted dX, dY and symbol characters. The variable for mode 1 is the symbol character which, thus far, was considered as a mode-quadrant character. In order for the system to operate correctly, the mode-quadrant character decoder 172 (FIG. 7) is disabled and the system operates as discussed above with reference to FIG. 6. Therefore, the 29th, 30th and 31st characters are received normally.

In order to change the system to another mode, a flag character such as the 32nd character is required before the mode-quadrant character can be received. Thus, the 33rd character is a mode 2, quadrant 2 character and the 34th, 35th and 36th characters are dX, dY and symbol characters. Again, since the system is in mode 2, the subsequently received 37th, 38th, 39th and 40th characters will all be interpreted as variable characters.

Figure 9:
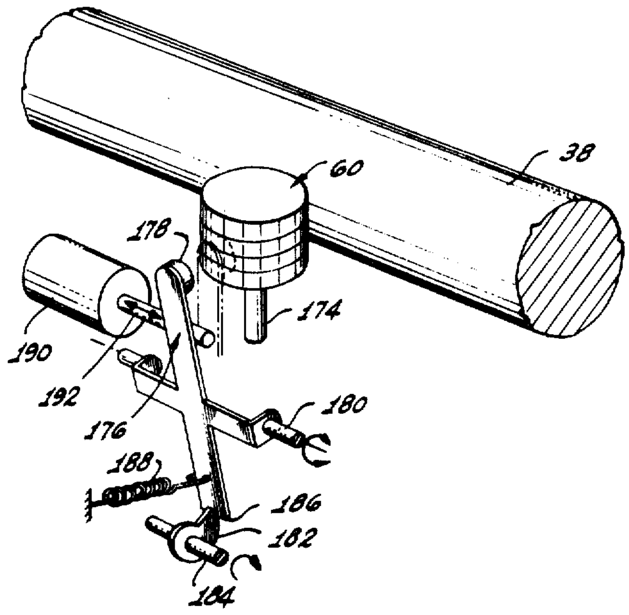
Fig. 9 is a diagrammatic perspective view of the main elements of the type head printing mechanism of a teletypewriter, together with a representative electromechanical print suppress mechanism for use with the graphing data terminal system of the present invention.

The print suppress mechanism in the presently preferred embodiment of the present invention is electromechanical in nature and is illustrated diagrammatically in FIG. 9. Generally, a teletypewriter prints by first positioning one of the plurality of symbols on a cylindrical type head 60 which is mounted on a rotatable and vertically movable shaft 174. The symbol to be printed is positioned directly opposite the platen 38. A hammer assembly 176 including a striking pad 178 is mounted adjacent to the type head 60 and is centrally pivotable about a horizontal shaft 180 by means of a cam 182 mounted on a rotating shaft 184. The cam 182 moves a lower end 186 of the hammer assembly 176 against a spring 188, and when the cam rotates past the end 186 of the hammer assembly, the spring pivots the hammer assembly about the shaft 180 so that the striker pad 178 forces the type head 60 and interposed ribbon (not shown, see FIG. 1) into contact with the platen 38 to print the symbol.

As a relatively large amount of time is needed in a teletypewriter to position the various serially actuated cams and rods which make up the type head 60 positioning apparatus, the print suppress mechanism is one embodiment of the present invention includes a solenoid 190 which can be activated to move a solenoid armature 192 in front of the hammer assembly 176 sometime before the hammer assembly would be actuated to strike the type head. Sufficient time is afforded to receive a character, determine if its significance is other than the symbol to be printed, and activate the solenoid 190 before the symbol can be printed.

Figure 10:
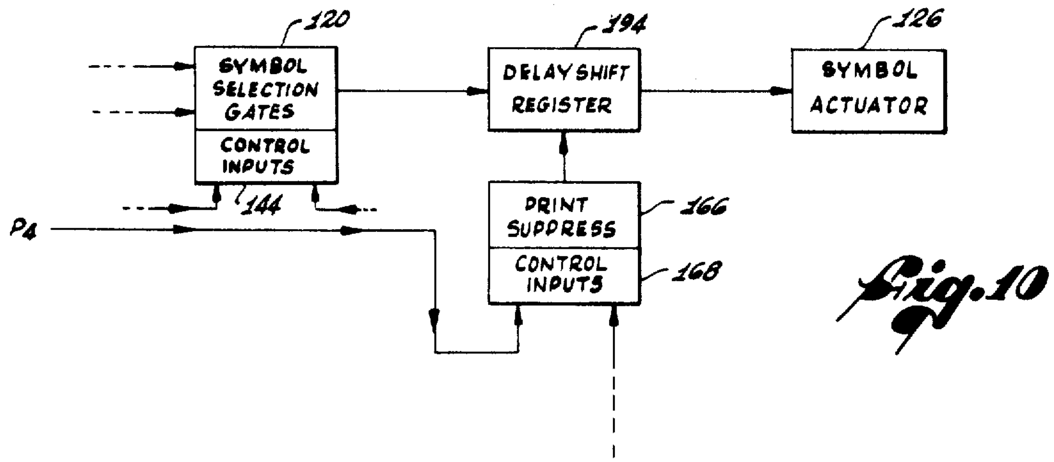
Fig. 10 is a partial block diagram of the decoder-controller shown in FIG. 6 showing an alternative electronic print suppress scheme.

An alternate form of the print suppress mechanism is shown in the partial block diagram of FIG. 10 which is substantially identical to the block diagram of FIG. 6, except for the addition of a delay shift register 194 between the symbol selection gates 120 and the symbol actuator 126. When the symbol selection gates 120 receive the symbol character, it is delayed in reaching the symbol actuator 126 by the shift register 194 until it is determined whether the symbol is to be printed or not. If not, the print suppress signal inhibits the transfer of the character from the delay shift register 194 to the symbol actuator 126.

Thus, the data terminal system described above can print both text and a graphical display at a relatively high speed and with considerably reduced character redundancy to decrease the amount of computer time required for economy. While a particular presently preferred embodiment of the data terminal system of the present invention has been described in detail above, it will be appreciated that many variations of the basic system are possible without departing from the spirit and scope of the present invention. Therefore, the scope of the invention is not to be limited except by the following claims.

1. A method of communicating data to a receiver, the data representing the coordinate and symbol information for a plurality of points of a graph to be plotted and thereafter generating the graphical plot, said method comprising:

analyzing said data to determine incremental coordinate difference information and positive or negative sign information of said coordinate difference information between points on the graph;

restricting the group of characters which may have coordinate difference significance to the numeric characters;

combining said sign information into a single item of quadrant information indicative of one of the four quadrants of a rectangular coordinate system;

comparing the quadrant, coordinate difference and symbol information with corresponding selected items of information previously stored in said receiver and designated as variable information;

determining a proper one of a plurality of modes of operation and generating a corresponding mode signal if any of said quadrant, coordinate, difference and symbol information is different than the corresponding information stored in said receiver each of said modes of operation having one of said items of coordinate difference information and said symbol information designated as variable;

combining said quadrant information and said mode signal into a single item of mode-quadrant information and restricting the group of characters which may have mode-quadrant significance to the alphabetic characters;

determining if said variable item of information is an alphabetic or a numeric character and, if alphabetic and the compared items of information are different, transmitting a flag signal to condition said receiver to change said stored items of information and thereafter transmitting said mode-quadrant, coordinate difference and symbol information to said receiver for appropriate storage and, if said variable item is numeric and the compared items are different, transmitting only said mode-quadrant, coordinate difference and symbol information to said receiver, said mode-quadrant character conditioning said receiver to store the appropriate items of information, and transmitting only said variable items of information to said receiver if the compared items of information are the same;

plotting the point and symbol on the graph by taking the complete information needed from the received information and appropriate items of stored information.

2. A system for encoding data for transmission to a receiver, the data being indicative of both textual material and the coordinate and point symbol information of the plurality of points on a graph to be plotted, said system comprising:

analyzing means for analyzing said data on a point-to-point basis to determine incremental coordinate difference information and positive or negative sign information of said coordinate difference information between points on the graph, said analyzing means combining said items of sign information into a single item of quadrant information indicative of one of the four quadrants of a rectangular coordinate system and restricting the group of characters which may have coordinate difference significance to the numeric characters;

information storage means in said receiver for storing selected items of coordinate difference, sign and symbol information for a previous point on said graph, said stored items being designated invariable and the items which are not stored being designated variable;

comparing means for comparing said coordinate difference, sign and symbol information of the analyzed point of said graph with the corresponding information stored in said storage means;

generating means for generating a mode-quadrant signal if at least one of said coordinate difference, sign and symbol information is different than the corresponding information stored in said storage means, said generating means further combining said one of said plurality of mode signals with said quadrant information to form an item of mode-quadrant information and restricting the group of characters which may have mode-quadrant significance to the alphabetic characters;

means for determining if said variable item of information is an alphabetic or a numeric character and, if alphabetic and the compared items of information are different, transmitting a flag signal to condition said receiver to change said stored items of information and thereafter transmitting said mode-quadrant, coordinate difference and symbol information to said receiver for appropriate storage and, if said variable item is numeric and the compared items are different, transmitting only said mode-quadrant, coordinate difference and symbol information to said receiver, said mode-quadrant character conditioning said receiver to store the appropriate items of information, and transmitting only said variable item of information to said receiver if the compared items of information are the same;

alphabetic character detecting means in said receivers for detecting alphabetic characters and conditioning said receiver to receive different stored information in response thereto whereby said mode-quadrant signal serves to condition said receiver; and means for plotting the point and symbol on the graph by taking the complete information needed from the received information and appropriate items of stored information.

PO-1050
(5/69)

UNITED STATES PATENT OFFICE
CERTIFICATE OF CORRECTION

Patent No. 3,609,701 Dated December 3, 1971

Inventor(s) ALLAN L. BUDD

It is certified that error appears in the above-identified patent and that said Letters Patent are hereby corrected as shown below;

Column 2, line 52, delete the second occurrence of "of";

Column 3, line 21, change "a" to --an--;

Column 5, line 18, change "15" to --fifteen--;

Column 6, line 44, cancel "the".

Column 7, line 54, after "dX", insert --values--;

Column 8, line 67, change "changes" to --changed--;

Column 11, line 34, at the end of the line, insert --character is fed to the Y actuator 124 through the--;

line 41, change "sequency" to --sequence--;

Column 12, line 6, change "and", second occurrence, should read -- an --;

line 24, change "system" to --stream--;

line 54, change "decoder" to --detector--;

Column 13, line 57, change "variable" to --invariable--.

Signed and sealed this 9th day of May 1972.

(SEAL)
Attest:

EDWARD M.FLETCHER, JR.
Attesting Officer

ROBERT GOTTSCHALK
Commissioner of Patents